(12) United States Patent
Roffman et al.

(10) Patent No.: US 6,520,638 B1
(45) Date of Patent: Feb. 18, 2003

(54) METHODS FOR DESIGNING MULTIFOCAL OPHTHALMIC LENSES

(75) Inventors: Jeffrey H. Roffman, Jacksonville, FL (US); Philippe F. Jubin, Jacksonville, FL (US); Timothy R. Poling, Jacksonville, FL (US); Michael Skinner, Jacksonville, FL (US); Sheila Hickson-Curran, Ponte Vedre Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/929,667

(22) Filed: Aug. 14, 2001

(51) Int. Cl.⁷ .................................................. G02C 7/04
(52) U.S. Cl. ...................................... 351/177; 351/161
(58) Field of Search .................... 351/160 R, 160.14, 351/161, 162, 177

(56) References Cited

U.S. PATENT DOCUMENTS

| | | |
|---|---|---|
| 4,580,882 A | 4/1986 | Nuchmann et al. |
| 4,704,016 A | 11/1987 | de Carle |
| 4,861,152 A | 8/1989 | Vinzia et al. |
| 4,976,534 A | 12/1990 | Miege et al. |
| 5,530,491 A | 6/1996 | Baude et al. |
| 5,864,379 A | 1/1999 | Dunn |
| 6,030,077 A | 2/2000 | Sawanno et al. |

*Primary Examiner*—Scott J. Sugarman
(74) *Attorney, Agent, or Firm*—Las Gianneschi

(57) ABSTRACT

The invention provides methods for designing lenses useful for correcting presbyopia, lenses incorporating such designs and methods for producing these lenses. The lenses of the invention exhibit a better distribution of the distance and near vision powers within the multifocal zone and, thus, improved visual acuity and wearer satisfaction.

21 Claims, 4 Drawing Sheets

METHODS FOR DESIGNING MULTIFOCAL OPHTHALMIC LENSES

FIELD OF THE INVENTION

The invention relates to ophthalmic lenses. In particular, the invention provides lenses that use more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Additionally, for persons who have had their natural lens removed and an intraocular lens inserted as a replacement, the ability to accommodate is totally absent.

Among the methods used to correct for the eye's failure to accommodate is the mono-vision system in which a person is fitted with one contact lens for distance vision and one lens for near vision. The mono-vision system permits the lens wearer to distinguish both distance and near objects, but is disadvantageous in that a substantial loss in depth perception results.

In another type of multifocal contact lenses, the optic zone of each lens is provided with more than one power. For example, the optic zone may have both distance and near power, which the eye uses simultaneously.

Neither of these methods provides good results in terms of visual acuity and lens wearer satisfaction. Thus, a need exists for lenses that both provide correction for the wearer's inability to accommodate and that overcome some or all of the disadvantages of known lenses.

DETAILED DESCRIPTION OF THE INVENTION AND PREFERRED EMBODIMENTS

Figure 1:
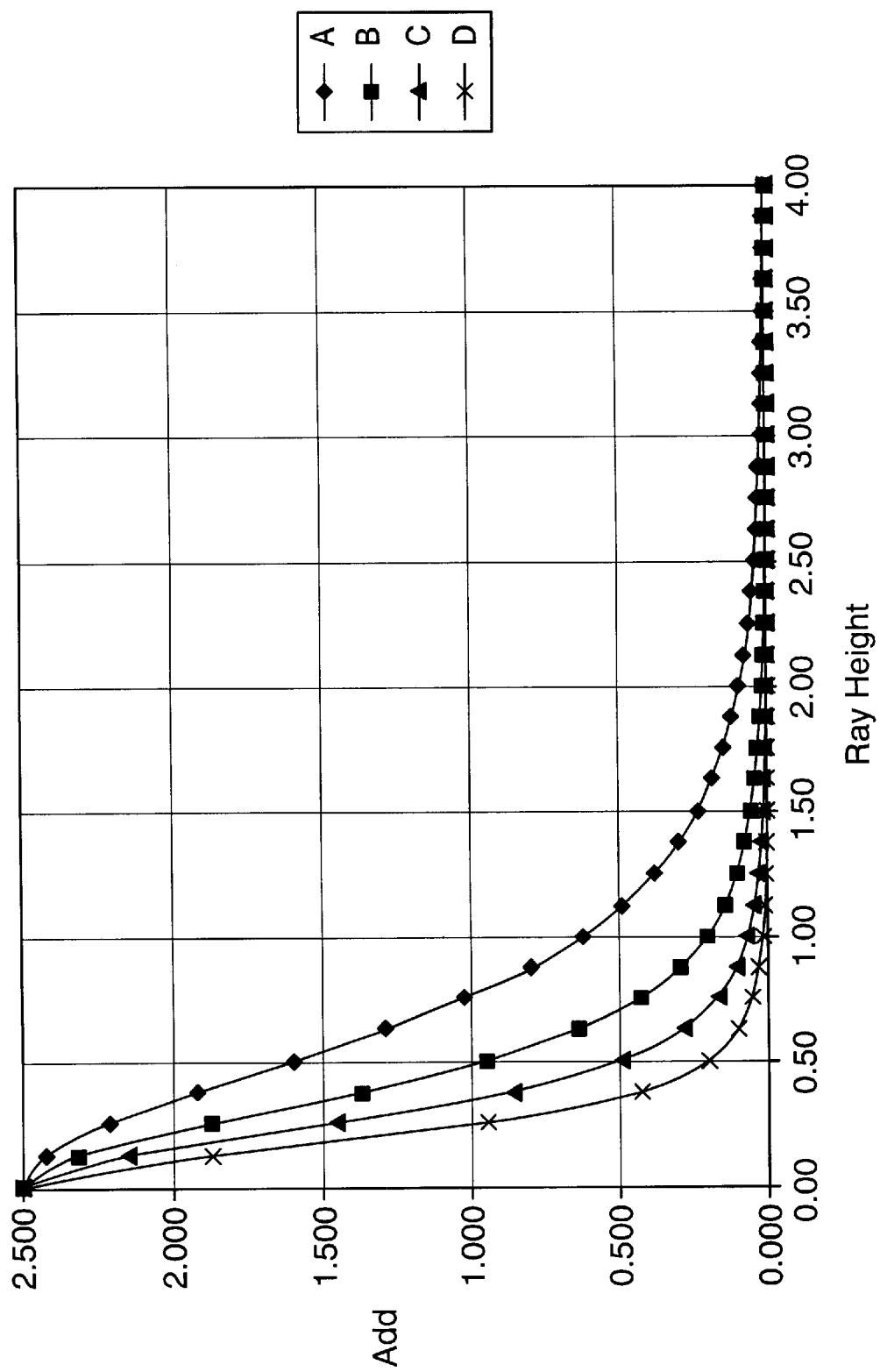
FIG. 1 is a graphic depiction of the power progression in multifocal vision power zones of differing widths designed according to the invention.

The invention provides methods for designing lenses useful for correcting presbyopia, lenses incorporating such designs, and methods for producing these lenses. In one embodiment, the method of the invention permits multifocal zones of near vision power and distance vision power to be varied as to amplitude, position, and width. The result of this variation is that there is a better distribution of the distance and near vision powers within the multifocal zone and, thus, improved visual acuity and wearer satisfaction.

In one embodiment, the invention provides a multifocal ophthalmic lens comprising, consisting essentially of, and consisting of an optic zone comprising, consisting essentially of, and consisting of one or more multifocal power zones where in a position, an amplitude, and a width for the zone is determined by the following equation:

$$Y = \left[\left[\frac{8a^3}{4a^2 + P(x+k)^2}\right]^S\right] * Add \quad (I)$$

wherein:

Y is the Add power at any point x on a surface;

x is a point on the lens surface;

a is 0.5;

k is the point within the power zone at which the power peaks;

P is the coefficient that controls the width of the power zone and is greater than about 0 and less than about 15;

S is the coefficient that controls the amplitude and its decrease in the periphery of the zone and is greater than about 0 and less than about 30; and Add is a value that is equal to or less than the difference in power between the near vision power and distance vision power of the lens.

For purposes of the invention, by "ophthalmic lens" is meant a contact lens, intraocular lens, or the like. Preferably, the lenses of the invention are contact lenses. By "position" is meant the power zone position in reference to the pupil. By "amplitude" is meant the extent or range of the power progression within the power zone. By "distance vision power" is meant the amount of refractive power required to correct the wearer's distance vision acuity to the desired degree. By "near vision power" is meant the amount of refractive power required to correct the wearer's near vision acuity to the desired degree.

In the lenses of the invention, the multifocal power zones may be on the object-side, or front, surface, the eye-side, or rear, surface, or both surfaces. The multifocal power zones have at least two regions of differing power alternating between distance and near vision power, and preferably three regions alternating between distance, near, and intermediate vision power. Each of the distance and near power regions may be of the same or of a different power from the other distance and near regions. Intermediate power may be supplied as a consequence of the power progression between the peak of the power of the near and distance vision regions. Alternatively, a region of intermediate power may also be designed using Equation I.

The multifocal power zone may occur at any point within the optic zone of the lens. The multifocal power zone is coaxial, the common axis being the Z axis and preferably rotationally symmetric. In the lenses of the invention, the distance, near, and intermediate optical powers are spherical or toric powers. Additionally, the distance, near, and intermediate optical power zones may be of any desired and practical dimensions.

In FIG. 1 is graphically depicted the power progression in four different multifocal power zone designs. In each design, the near vision power is at the center of the zone and the distance vision power is at or towards the periphery of the zone. By periphery is meant the region or area farthest from the center of the zone. The values used in Equation I for each of the designs is set forth in the following Table 1.

TABLE 1

| Add | Design A 2.50 D | Design B 2.50 D | Design C 2.50 D | Design D 2.50 D |
|---|---|---|---|---|
| a | 0.50 | 0.50 | 0.50 | 0.50 |
| k | 0.0 | 0.0 | 0.0 | 0.0 |
| P | 1.0 | 2.5 | 5.0 | 10.0 |
| S | 2.000 | 2.000 | 2.000 | 2.000 |

Figure 2:
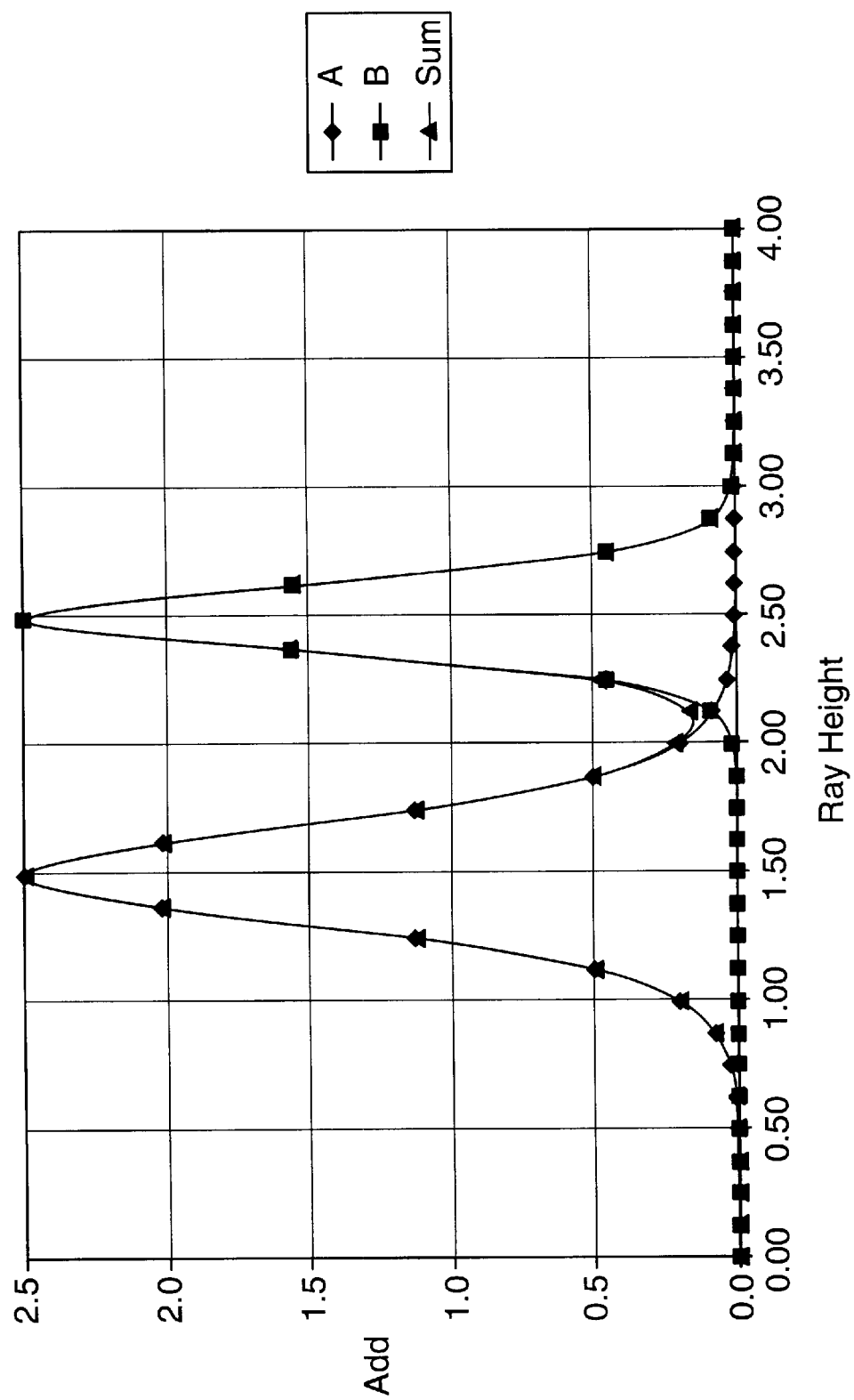
FIG. 2 is a graphic depiction of a five power region design designed according to the invention.

In FIG. 2 is graphically depicted the power progression in a multifocal power zone having five power regions. The composite design of FIG. 2 is achieved by taking the sum of the values generated by using Equation I in the two cases as follows:

TABLE 2

| Add | Case A 2.50 D | Case B 2.50 D |
|---|---|---|
| A | 0.50 | 0.50 |
| K | −1.5 | −2.5 |
| P | 3.5 | 5.0 |
| S | 4.000 | 6.283 |

Use of the composite design provides a simple method for creating multifocal power zones in which the characteristics of the inner power regions, meaning the regions nearest to the geometric center of the lens, differ from those of the outer, or peripheral, regions.

Figure 3:
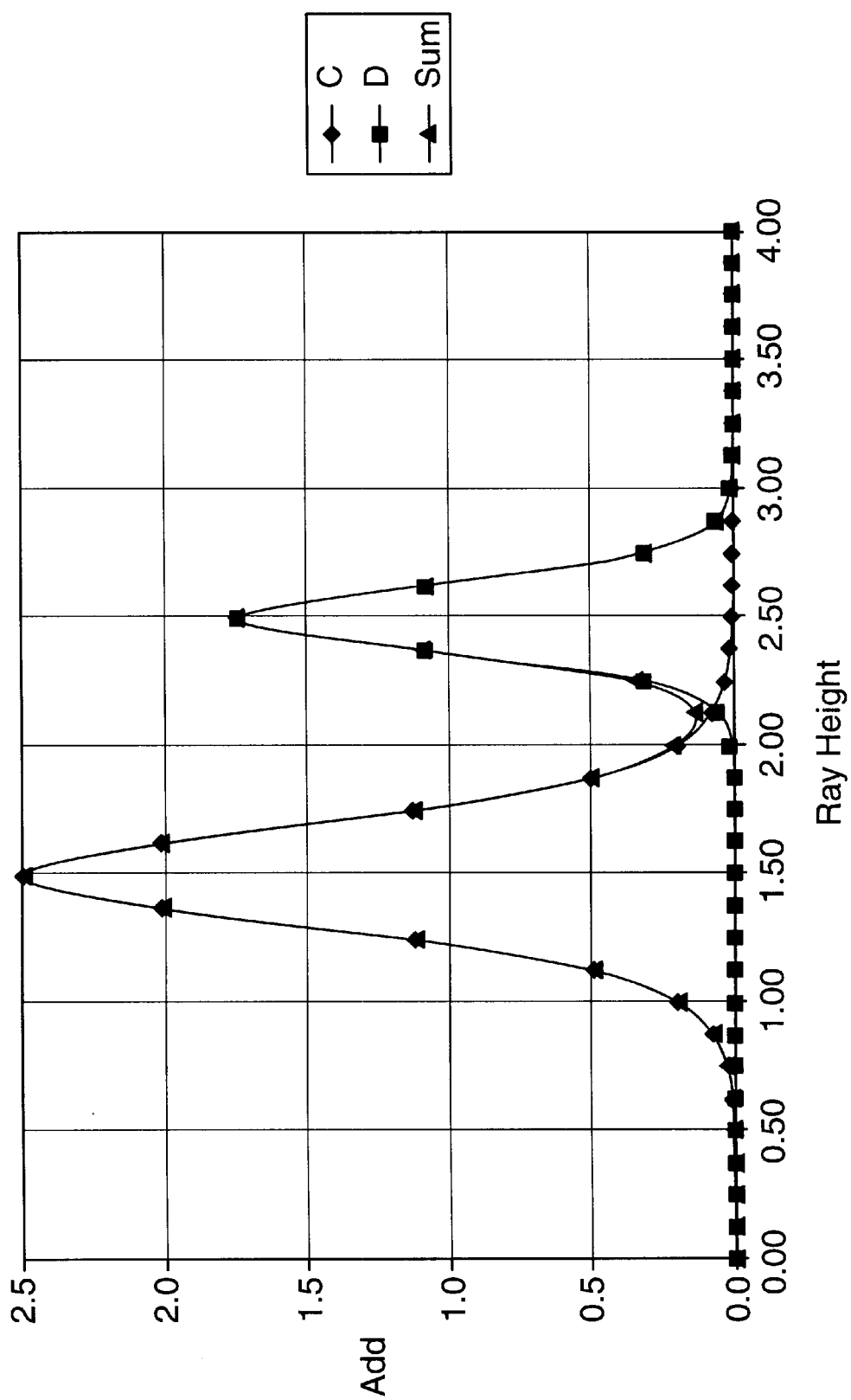
FIG. 3 is a graphic depiction of an alternative embodiment of a five power region design according to the invention.

In FIG. 3 is graphically depicted the power progression of a multi-region composite design in which the Add differs from one near vision power region to the other. The composite design was achieved by taking the sum of the values generated by using Equation I in the two cases as follows:

TABLE 3

| Add | Case C 2.50 D | Case D 1.75 D |
|---|---|---|
| A | 0.50 | 0.50 |
| K | −1.5 | −2.5 |
| P | 3.5 | 5.0 |
| S | 4.000 | 6.283 |

The advantage of this design is that it may result in an improvement of night vision in the lens wearer because the near vision power decreases in the peripheral portions of the optic zone.

In another embodiment of the invention a method for designing lenses, and lenses made by this method, are provided in which the rate of change and contour of the power change from distance to near and near to distance vision power is varied. In this embodiment, the invention provides a multifocal ophthalmic lens comprising, consisting essentially of, and consisting of an optic zone comprising, consisting essentially of, and consisting of near vision power and distance vision power, wherein a rate of change and a contour of a power change between the distance near vision powers is determined according to an equation selected from the group consisting of:

$$\text{Power}=A-((1-P)^x)*A \quad \text{(II)}$$

and $$\text{Power}=((1-P)_x)*A \quad \text{(III)}$$

wherein:

A is the Add power;

P is the pupil fraction from 0 to 1; and

X is greater than 0, preferably greater than 1, and more preferably 2, π, or 27π.

For purposes of Equation II and III, P is determined as follows. The maximum and minimum pupil diameters are selected along with interval steps from the minimum to the maximum. The interval steps selected are at the designers discretion, but preferably are suitable to facilitate production of the lens as, for example, by computer numerical controlled lathe. From the maximum diameter, the percentage of total diameter P is defined.

Equation II is used for center distance lens designs meaning that the distance vision power is in the center of the optic zone and the near vision power is at the optic zone's periphery. Equation III is used for center near lens designs, or lenses in which the near vision power is in the center and the distance vision is at the periphery.

Alternatively, and as yet another embodiment of the invention, the rate of change and contour of the power change from distance to near and near to distance vision power is varied using one of the following equations:

$$\text{Power}=A-|\text{Sin}(t)^x|*A \quad \text{(IV)}$$

and $$\text{Power}=|\text{Sin}(t)^x|*A \quad \text{(V)}$$

wherein

A is the Add power;

t is the pupil fraction from 90 to 180 degrees; and

X is greater than 0, preferably greater than 1, and more preferably 2, π, or 27π.

For purposes of Equation IV and V, t is determined by selection of the maximum and minimum pupil diameters. The minimum diameter is assigned a value of 90 degrees and the maximum diameter of 180 degrees, in linear intervals.

Equation IV is used for center distance designs and Equation V is used for center near lenses. Thus, in yet another embodiment, the invention provides a multifocal ophthalmic lens comprising, consisting essentially of, and consisting of an optic zone comprising, consisting essentially of, and consisting of near vision power and distance vision power wherein a rate of change and a contour of a power change between the distance near vision powers is determined according to and equation selected from the group consisting of:

$$\text{Power}=A-|\text{Sin}(t)^x|*A \quad \text{(IV)}$$

and $$\text{Power}=|\text{Sin}(t)^{x}*A \quad \text{(V)}$$

wherein:

A is the Add power;

t is the pupil fraction from 90 to 180 degrees; and

X is greater than 0, preferably greater than 1, and more preferably 2, π, or 2π.

Figure 4:
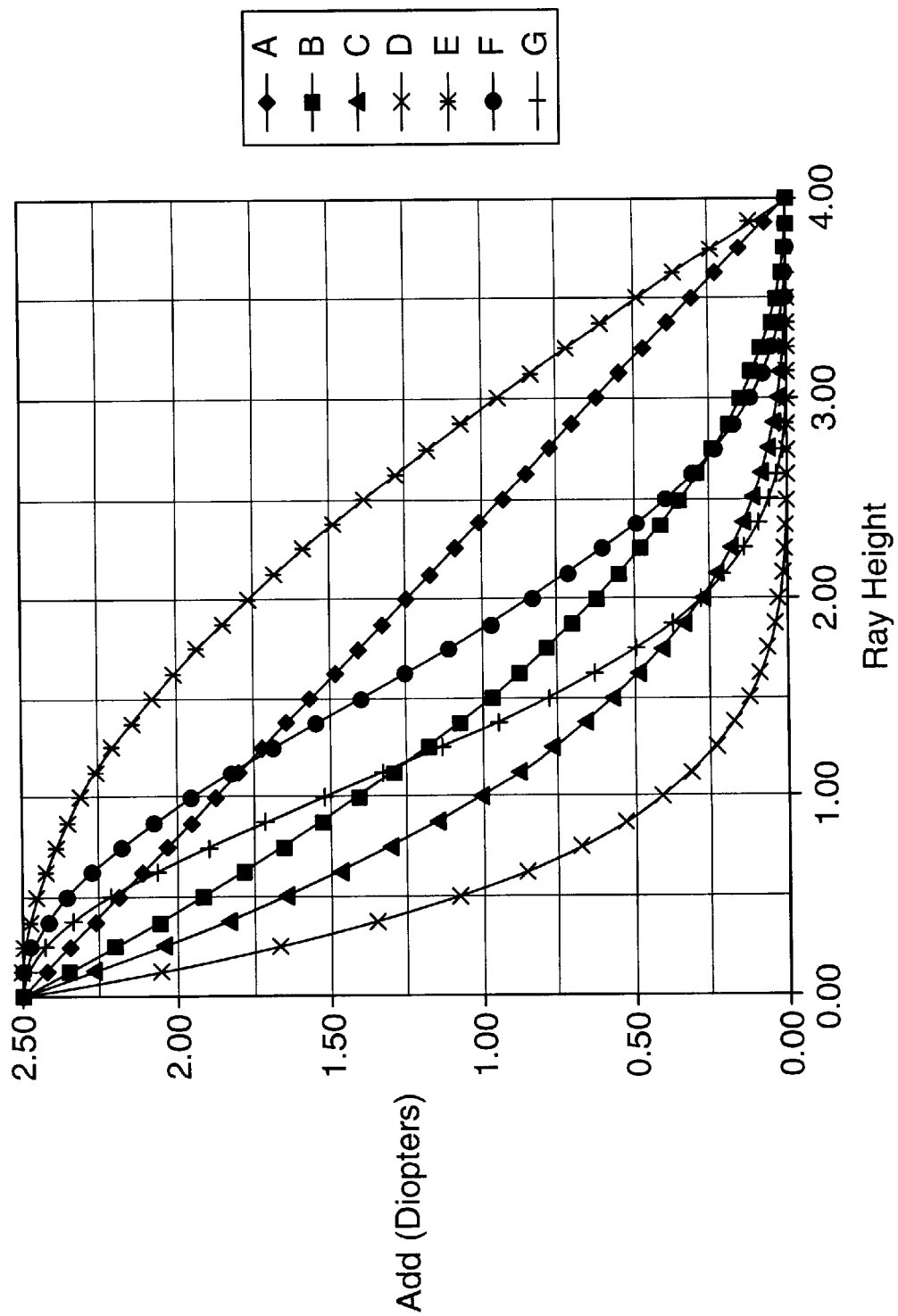
FIG. 4 is a graphic depiction of the power progression in four multifocal power zones designed according to the invention.

In FIG. 4 is graphically depicted the power progression for a variety of designs. Designs A through D are calculated using Equation III and E through G using equation V. Both equations map the same interval (0,1) and start and end at the same values (A and 0). However, because Sin(t) is not a linear function, the progression rate generated differs. Thus, using one equation instead of the other enables the amount of Add power for a given pupil size to be changed, similar to Equations II and IV.

The designs of the invention are useful in producing contact lenses that are hard or soft lenses. Soft contact lenses, made of any material suitable for producing such lenses, preferably are used. The lenses of the invention may have any of a variety of corrective optical characteristics incorporated onto the surfaces in addition to distance and near optical powers, such as, for example, cylinder power.

The lenses of the invention may be formed by any conventional method. For example, the multifocal zones formed therein may produced by diamond-turning using alternating radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

What is claimed is:

1. A multifocal ophthalmic lens, comprising an optic zone comprising one or more multifocal power zones wherein a position, an amplitude, and a width for the zone is determined by the following equation:

$$Y = \left[\left[\frac{8a^3}{4a^2 + P(x+k)^2}\right]^S\right] * Add \qquad (I)$$

wherein:

Y is an Add power at any point x on a surface;

x is a point on the lens surface;

a is 0.5;

k is a point within the power zone at which the power peaks;

P is greater than about 0 and less than about 15;

S is greater than about 0 and less than about 30; and

Add is a value that is equal to or less than the difference in power between the near vision power and distance vision power of the lens.

2. The lens of claim 1, wherein the lens is a soft contact lens.

3. The lens of claim 2, wherein the multifocal power zone is on a front surface of the lens and a back surface of the lens comprises cylinder power.

4. A multifocal ophthalmic lens, comprising an optic zone comprising at least one near vision power and at least one distance vision power, wherein a rate of change and a contour of a power change between the distance near vision powers is determined according to an equation selected from the group consisting of:

$$Power = A - ((1-P)^x) * A \qquad (II)$$

and $$Power = ((1-P)^x) * A \qquad (III)$$

wherein

A is an Add power;

P is between about 0 to 1; and

X is greater than 0.

5. The lens of claim 4, wherein the lens is a soft contact lens.

6. The lens of claim 4, wherein the distance and near power zone is on a front surface of the lens and a back surface of the lens comprises cylinder power.

7. The lens of claim 4, 5, or 6, wherein the equation is $$Power = A - ((1-P)^x) * A.$$

8. The lens of claim 4, 5, or 6, wherein the equation is $$Power = ((1-P)^x) * A.$$

9. The lens of claim 7, wherein X is greater than 1.

10. The lens of claim 9, wherein X is 2, $\pi$, or $2\pi$.

11. The lens of claim 8, wherein X is greater than 1.

12. The lens of claim 11, wherein X is 2, $\pi$, or $2\pi$.

13. A multifocal ophthalmic lens, comprising an optic zone comprising at least one near vision power and at least one distance vision power wherein a rate of change and a contour of a power change between the distance near vision powers is determined according to and equation selected from the group consisting of:

$$Power = A - |Sin(t)^x| * A \qquad (IV)$$

and $$Power = |Sin(t)^x| * A \qquad (V)$$

wherein:

A is an Add power;

t is a pupil fraction from 90 to 180 degrees; and

X is greater than 0.

14. The lens of claim 13, wherein the lens is a soft contact lens.

15. The lens of claim 13, wherein the distance and near power zone is on a front surface of the lens and a back surface of the lens comprises cylinder power.

16. The lens of claim 13, 14, or 15, wherein the equation is $$Power = A - |Sin(P)^x| * A.$$

17. The lens of claim 13, 14, or 15, wherein the equation is $$Power = |Sin(P)^x| * A.$$

18. The lens of claim 16, wherein X is greater than 1.

19. The lens of claim 18, wherein X is 2, $\pi$, or $2\pi$.

20. The lens of claim 17, wherein X is greater than 1.

21. The lens of claim 20, wherein X is 2, $\pi$, or $2\pi$.

* * * * *